Feb. 27, 1968 E. G. GILBERT 3,371,223

ELECTRONIC SWITCHING APPARATUS

Filed June 11, 1964

INVENTOR.
ELMER G. GILBERT

BY Richard D. Stephens

ATTORNEY 3,371,223
Patented Feb. 27, 1968

3,371,223

ELECTRONIC SWITCHING APPARATUS

Elmer G. Gilbert, Ann Arbor, Mich., assignor to Applied Dynamics, Inc., Ann Arbor, Mich., a corporation of Michigan Filed June 11, 1964, Ser. No. 374,341
16 Claims. (Cl. 307—239)

ABSTRACT OF THE DISCLOSURE

Electronic switching circuits to provide a floating single-pole single-throw switch including means for rectifying the output of a floating transformer secondary to provide repeated pulses to a semi-conductor switch, with high frequency pulses being controllably applied to the transformer primary and the frequency selected so that successive rectified pulses are applied to the semi-conductor switch in less time than the recovery time of the semi-conductor switch and the switch remains continuously closed while the pulses are being applied, with the rectified pulses being unfiltered, so that the switch will open with minimum delay when the high frequency pulses are discontinued.

Figures 1, 2A, 2B, 2C, 3:
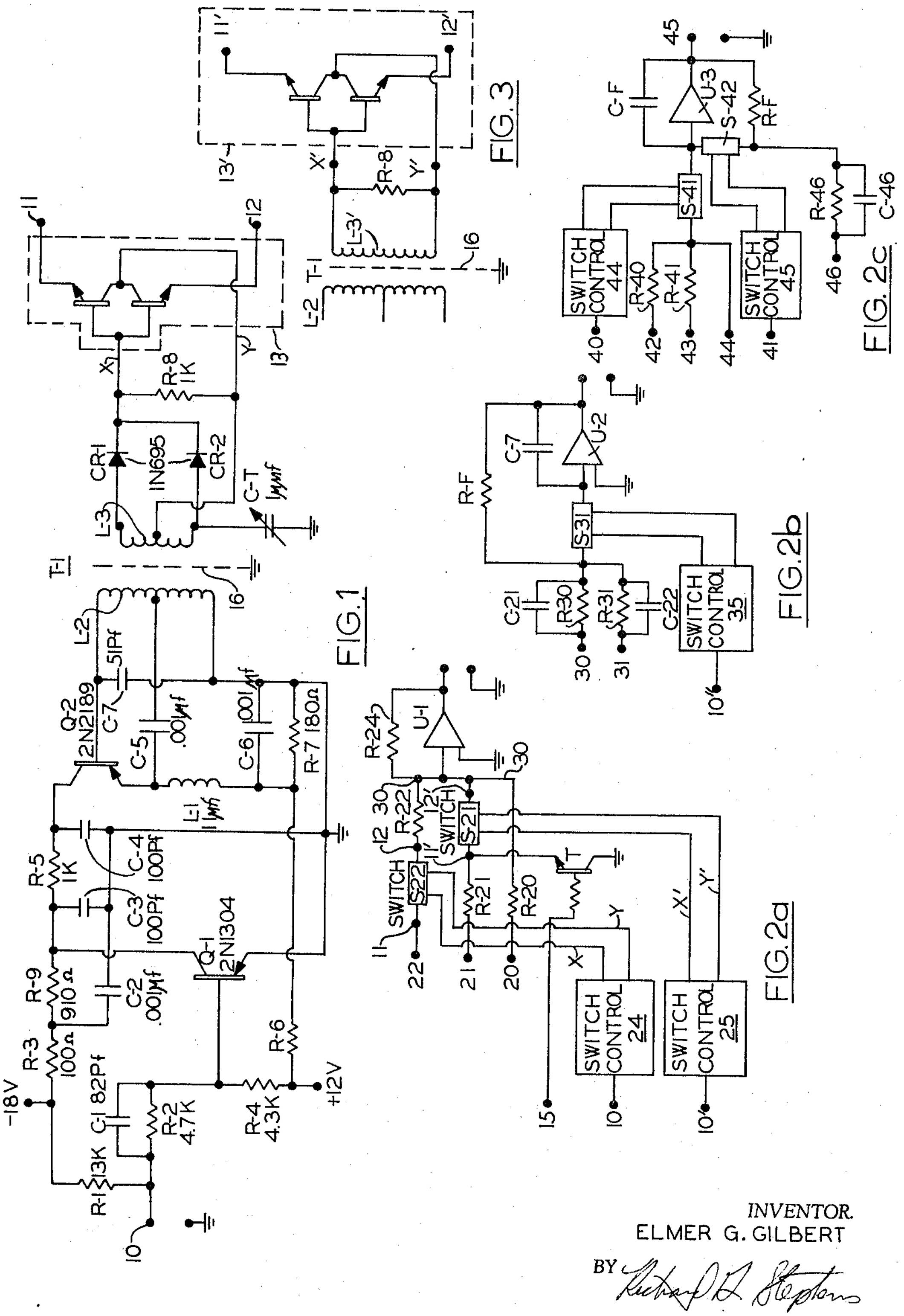

This invention relates to electronic switching apparatus, and more particularly, to an improved high-speed electronic switching arrangement especially adapted for fast and precise switching of electronic analog computer signals. In the analog computer, automatic control and instrumentation arts, a variety of devices are required for high speed switching of analog signals, to connect and disconnect such signals to and from operational amplifiers, for example.

In the digital computer arts, information is represented by the presence or absence of signals, and while the timing of a voltage pulse may be quite important in representing digital information, the precise magnitude of a pulse is generally unimportant. In the analog computer arts, on the other hand, wherein information is represented by the precise magnitudes of voltages and currents, it is highly desirable in the interests of computational accuracy that switching be accomplished without changing the magnitudes of such voltages and currents, and furthermore, it is desirable both that voltage drops not be developed across the switches used and that control signals used to control the switches not be added or subtracted to the voltages or currents being switched. Because much smaller voltage drops are obtainable with semiconductor switches, they are, in general, much preferred to vacuum-tube switches where analog computer voltages are to be switched. A variety of known transistor switches are connected to be biased "off" by fixed biasing potentials and adapted to be gated "on" or closed by the application of control signals. While such switches are satisfactory for many applications, and in particular those applications where one side of the switch is always connected to a precisely fixed potential level, a number of switching applications require that both sides of the switch carry varying potentials. The selective switching of input signals into the summing junctions of operational amplifier circuits is a most important example. While many prior art switching circuits may be adjusted so that the required biasing potentials temporarily do not introduce errors into the signals being switched, semiconductor or vacuum tube drift due to temperature changes and the like frequently result in mis-adjustment and computational error. Similarly, the flow of leakage currents between a reference level (such as ground) and the switch terminals may cause appreciable voltage offset errors, particularly in circuits having a high impedance to ground. In the past, the offset errors characteristic of most transistor switches sometimes have been avoided by the use of electromechanical switches; and while such switches frequently have been satisfactory for many computing applications, they are completely unsuitable for controlling signals with the speeds and accuracies required for many new computer problems, and especially those which involve high-speed repetitive computation modes. Also, the drift errors in certain transistor switches have been tolerable in some applications which involved only short periods of computation, but such errors become intolerable with the use of many present repetitive problem solutions.

As well as avoidance of the introduction of offset voltages, speed and timing accuracy are equally important requirements for analog switches used for repetitive computation. Where such computation modes use accelerated time scales, as is usually the case, the effect on accuracy of an error in the timing of the opening or closing of a switch is multiplied by the time scale factor, sometimes a factor of several thousand, seriously degrading computer accuracy. And furthermore, where iterative calculation is involved, with the results of one computation cycle being used as the initial values for the succeeding cycle, a small timing error due to switching has an increasing deleterious effect on accuracy as successive computation cycles proceed. Thus a wide need exists for electronic switches which are free of voltage offset errors and leakage currents, and which are extremely fast.

In accordance with the present invention a high-speed semiconductor switching device having an extremely low "closed" resistance and an extremely high "open" resistance is operated without the use of biasing potentials referenced to any fixed potential level, and hence no offset voltages or leakage currents are introduced into the signals being switched. The switching device is controlled by a rectified but unfiltered radio frequency signal which turns the switching device on. The radio frequency signal is obtained by gating on an oscillator, the oscillator output is inductively and not conductively coupled to an inductor (such as a transformer secondary winding) to provide a signal which is connected to the switching device, and the switching device is switched on as long as the oscillator provides radio frequency signals to the switching device. Because the rectified radio frequency control signal need not be filtered, the switching circuit has no filtering time-constant, so that switching occurs very rapidly.

Thus it is an object of the present invention to provide improved apparatus for switching analog voltage or current signals.

It is a more specific object of the invention to provide electronic switching apparatus capable of switching analog signals without introducing offset errors due to biasing potentials, which apparatus is capable of switching at extremely high speeds.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

FIG. 1 is an electrical schematic diagram of a preferred form of the switch of the present invention;

FIG. 2*a* is an electrical schematic diagram partially in block form illustrating the improved switching arrangement connected to switch input potentials to a high-gain feedback operational amplifier;

FIGS. 2*b* and 2*c* are electrical schematic diagrams illustrating how the improved switching apparatus may be incorporated in analog track-and-hold circuits and integrator circuits, respectively; and FIG. 3 is an electrical schematic showing a modified form of switch unit.

Referring now to FIG. 2*a*, there is shown a conventional feedback operational amplifier U–1 into which a plurality of input signals are shown being switched. In FIG. 2*a* amplifier U–1 is shown for sake of illustration with two switched input signals and one unswitched input signal. The unswitched input signal is connected to terminal 20, to apply a current to summing junction 30 of amplifier U–1 via scaling resistor R–20. The output signal of amplifier U–1 is also applied to summing junction 30 via feedback resistor R–24. A first input signal is connected to terminal 21 to be applied via scaling resistor R–21 to summing junction 30 whenever switch S–21 is closed, and to be effectively isolated from the summing junction whenever switch S–21 is open. A second input signal is connected to terminal 22, to be applied whenever switch S–22 is closed, to scaling resistor R–22 and thence to summing junction 30. Thus switch S–21 is located on the summing junction side of its associated scaling resistor, while switch S–22 is located on the input terminal side of its associated scaling resistor.

Switches S–21 and S–22 each may comprise a switching unit of the type shown in FIG. 1. The terminals 11, 12 of the circuit of FIG. 1 are shown as the terminals 11, 12 of switch device S–22 of FIG. 2*a*, and the counterpart terminals of switch S–21 are shown as 11′ and 12′. The control apparatus for controlling switch S–22 is shown in FIG. 2*a* at 24, and the control apparatus for controlling switch S–21 is shown at 25. Control apparatus 24 may comprise all that apparatus shown in FIG. 1 to the left of switch device 13 (shown within dashed lines), and control apparatus 25 may be identical apparatus.

In the operation of a computer, selected and usually varying input signals from other amplifiers and various other circuits will be applied to terminals 20, 21, and 22. At any instant, any voltage existing at summing junction 30 is amplified by amplifier U–1, to provide an output signal at terminal 40 such that the feedback current through feedback resistor R–24 substantially cancels the resultant input current applied to summing junction 30 via the input resistors (R–20, R–21, R–22). Feedback amplifier U–1 conventionally is provided with high loop gain, of the order of 50,000 or greater at frequencies of interest. Because of the high gain of amplifier U–1 and the negative feedback connection, the voltage at summing junction 30 is maintained essentially at ground, or zero volt potential. If an appreciable voltage drop were to exist across either switch S–21 or S–22, an unacceptable computation error could result, since voltage offsets across switches S–21 and S–22 are equivalent to offsets or errors in the input voltages applied to terminals 21 and 22. Because the input signals applied to terminals 21 and 22 may be varying potentials rather than constant potentials, it will be seen that both terminals of each switch may vary in potential with respect to ground, (or with respect to any other fixed reference level).

FIG. 2*b* illustrates an electronic switch (S–31) being used in an analog track-and-hold circuit. When switch S–31 is closed, amplifier U–2 acts as a summing amplifier to add the two input signals applied at terminals 30 and 31 via scaling resistors R–30 and R–31. When switch S–31 is open, capacitor C–7 holds the U–2 amplifier voltage at the value which was present at the instant when switch S–31 opened. Switch S–31 may comprise the switch unit 13 of FIG. 1, and switch control unit 35 may comprise the apparatus shown to the left of unit 13 in FIG. 1. The ability of the invention to provide extremely low leakage current is particularly advantageous in track-and-hold circuits, since leakage during the "hold" mode of operation would otherwise undesirably cause the amplifier output to change continuously. In FIG. 2*b* conventional speed-up capacitors C–21 and C–22 parallel input resistors R–30 and R–31, respectively, to insure good frequency response.

FIG. 2*c* illustrates the use of two electronic switches connected to control a Miller integrator circuit. When both switch S–41 and switch S–42 are open, the integrator is in its "hold" condition, and the voltage at terminal 45 remains constant. When switch S–41 is closed and switch S–42 is open, the integrator is in its "operate" condition, so that the output voltage at terminal 45 will vary in accordance with the time integral of the resultant input voltage applied via terminals 42 and 43, and the current applied via terminal 44. Conversely, when switch S–42 is closed and switch S–41 is open, the integrator is in its "initial condition set" mode, so that the output voltage at terminal 45 is forced to become proportional to an "initial condition" voltage applied at terminal 46. A conventional speed-up capacitor C–46 is shown connected in parallel with the initial condition scaling resistor R–46. In FIG. 2*c* switches S–41 and S–42 each may comprise units of the type shown at 13 in FIG. 1, and their respective switch control units 44 and 45 each may comprise circuits identical to those shown to the left of unit 13 in FIG. 1.

Referring now to FIG. 1, the signal terminals of the electronic switch are shown at the right side of the figure at 11 and 12, and a control terminal 10 for opening and closing the switch is shown at the left. The control voltage applied to terminal 10 has been selected in the specific embodiment illustrated to vary between ground (zero volts) and minus 6 volts. Resistors R–1, R–2 and R–4 connected between −18 and +12 volts supply terminals are proportioned so that with zero volts applied at terminal 10, the base of transistor Q–1 will be reversed-biased and transistor Q–1 will be cut off. Conversely, when a −6 volt signal is applied to terminal 10, the base of Q–1 will go negative, turning on transistor Q–1. Capacitor C–1 is a conventional "speed-up" capacitor provided to enhance quick application of the control signal leading and trailing edges to switch transistor Q–1.

Transistor Q–1 acts as a shorting switch connected across an oscillator to be described. When the input signal applied to transistor Q–1 is at the zero volt level, transistor Q–1 is open, and the oscillator generates a 19 megacycle signal. When the input signal applied at terminal 10 is at the −6 volt level, transistor Q–1 conducts, shorting across the oscillator circuit and preventing oscillation. The oscillator circuit includes transistor Q–2 and a parallel tuned circuit comprising coil L–2 and capacitor C–7, and the oscillator is a transistorized version of a conventional Hartley oscillator. An RF current path will be seen to exist from the Q–2 collector-emitter circuit through capacitor C–5 and the lower portion of coil L–2 to ground. The voltage induced in the upper portion of coil L–2 is regeneratively applied to the Q–2 base to provide oscillation. A de-coupling network including resistors R–5 and R–9, and capacitors C–2 to C–4, isolate the RF signal from the −18 volt supply terminal. Choke L–1 permits the Q–2 emitter to follow the RF voltage without loading the oscillator tank circuit. The resistance-capacitor combination of R–6 and C–6 operates to isolate the RF signal from the +12 volt power supply.

Coils L–2 and L–3 comprise the primary and secondary windings of a radio frequency air-core transformer indicated generally at T–1. In one practical form of the invention primary winding L–2 comprised 12 turns of #22 enameled wire wound on a 7⁄16 inch polystyrene rod, with the tap located two turns from one end; and the the secondary winding L–3 comprised 8 turns of #30 wire, center-tapped. The use of an air core transformer operating at a very high frequency, in addition to increasing switching speed, permits the use of small coil dimensions and thus enables one to provide minimum stray capacity between switch 13 and the switch drive circuitry, thereby avoiding undesirable coupling of the high frequency switch drive signals into the circuit controlled by switch 13. Also the capacity from ground to each of the switch terminals is minimized. As indicated at 16 in FIG. 1, such unwanted coupling may be even further reduced by provision of an electrostatic shield between primary L–2 and secondary L–3 of radio frequency transformer T–1. While the use of small coil dimensions and electrostatic shielding both serve to keep radio frequency signal out of the computer circuits connected to terminals 11, 12 unsymmetrical tapping of coil L–3 and differences in the characteristics of diodes CR–1 and CR–2 comprise possible sources of small RF signals. These asymmetries may be counteracted by provision of a very small trimmer capacitor, such as that shown as C–T in FIG. 1. The use of such a trimming capacitor will be seen to be optional in many embodiments of the invention.

The 19 megacycle signal provided by the oscillator and coupled into coil L–3 is rectified by two diodes CR–1 and CR–2 connected to opposite ends of the L–3 winding. The two diodes provide full-wave rectification, which results in a positive voltage being developed across resistor R–8 and applied to the bases of a transistor switch unit shown within dashed lines at 13. Inasmuch as the transistors within switch unit 13 are NPN type, the application of the positive voltage to the bases of the transistors serves to turn-on or short circuit the switch unit. It will be apparent that, if desired, the connections of terminals X and Y to the switch unit may be interchanged if opposite conductivity type transistors were used so that the occurrence of oscillation would provide a negative voltage to the transistor bases to switch on the transistor switch unit. Transistor switch unit 13, while shown as comprising a pair of interconnected NPN transistors may take a variety of known equivalent forms, and may comprise four junctions mounted on the same crystal. Planar epitaxial transistors types 2N2356 and 2N2356A silicon transistors have been successfully used. A commercially available General Electric Company chopper transistor No. 4JX12C737 has operated satisfactorily. It may be noted that the transistors of switching unit 13 are connected in an inverted configuration to obtain superior static performance.

In operation in the circuit of FIG. 1, the switch has a very low forward or closed resistance, of the order of 5 ohms, and an extremely high open resistance, of the order of $10^{-6}$ megohms, and an extremely fast response is obtained, so that the switch may be opened or closed in approximately two microseconds.

It may be noted that no biasing potentials are connected to coil L–3, diodes CR–1 and CR–2, resistor R–8 and switch unit 13, and instead, that apparatus all is left floating with respect to ground. Thus no matter how a signal voltage connected to one of the two switch terminals varies with respect to ground, no offset voltage is added to the signal voltage as the signal voltage is connected through the switching device 13. Furthermore, leakage currents can only flow from winding L–3 through shield 16 to ground, and not to any power supply voltages, and hence such leakage currents may be made negligibly small. It also is important to note that except for air-core transformer T–1, the switch control voltage is essentially direct-coupled to operate the switching device 13, without other reactive elements being interposed. The control voltage applied to terminal 10 is direct-coupled to transistor Q–1 to open or close transistor Q–1 substantially immediately. The switching on and off of transistor Q–1 switches the oscillator on and off extremely rapidly. The first rectified pulse of current is applied to switch terminals X and Y one half-cycle after the oscillator is turned on, because there is no reactive filtering of the rectified RF signals. This enables the switch to be turned on and off with a speed of response which is limited substantially solely by the characteristics of the semiconductor switch 13 itself, with the control circuitry contributing no significant time delay. An important feature of the invention, and one contributing extremely importantly to the speed of operation of the switch, is that the rectified RF pulses are not filtered. Instead, the oscillator frequency is made high enough so that successive rectified pulses occur in less time than the recovery time of the transistor switch 13. With filtering eliminated, the turn-on and the turn-off times are limited substantially solely by the turn-on time and the turn-off, or recovery time, respectively, of switch 13. In the specific embodiment shown in detail the recovery time of the switch unit used was approximately 2 microseconds. In general, the turn-on time of such switches is considerably shorter than the turn-off, or recovery time. It will be apparent that even higher radio frequency signals may be used with switches having shorter recovery times. For a given switch, the oscillator frequency should be at least two times the reciprocal of the switch recovery time, and of course, may be much higher.

While coil L–3 is shown center-tapped and a pair of diodes are shown connected to provide full-wave rectification of the voltage induced in coil L–3, it is possible to use a single diode instead to provide half-wave rectification. Because of the greater conversion efficiency of a full-wave rectifier, considerably less power need be provided by the oscillator if full-wave rectification is provided as shown. Where two or more switch units are to be switched simultaneously, the same oscillator unit may be connected to a plurality of RF transformers such as T–1, with the output of each transformer controlling a respective switch unit, but for many applications of the invention, due to the simplicity of the oscillator and control circuit, a separate oscillator may be provided for each separately located switch unit, making it easier to separately shield each oscillator-switch unit combination in a computer or like device.

A low resistance R–8 is shown connected between the base-collector interconnections of switch 13. The provision of resistor R–8 serves to speed recovery time by insuring a relatively low impedance path even when switch terminals 11 and 12 are connected to very high impedance circuits.

In some quite critical applications the stray capacity across the terminals of a switch unit (such as 13, FIG. 1) may result in significant crosstalk when the switch unit is open. Such cross-talk may be reduced by a circuit such as the transistor T circuit shown in FIG. 2*a*. Transistor T is arranged to turn on when its respective switch (S–21 in FIG. 2*a*) is open, thereby tying the input terminal of the switch to a reference level (shown as ground), and thereby preventing the input voltage on terminal 21 from having any effect upon the output voltage from amplifier U–1. Transistor T, an NPN type chosen to have very low leakage current, may be turned on by application of a positive voltage at terminal 15 simultaneously with the application of the negative voltage at terminal 10′. A transistor clamping circuit, the circuit of transistor T, may be used, of course, in other switching circuits, such as the track-and-hold circuit of FIG. 2*b* or the integrator circuit of FIG. 2*c*.

In the modified arrangement shown in FIG. 3, the switch unit shown is connected so that the radio frequency voltage induced in coil L–3′ is applied directly, without intervening diodes, to the switch unit 13′, and in such a configuration the base-collector junctions of the two transistors of the switch unit provide rectification. The circuit of FIG. 1 utilizing diodes is preferred, however, since it provides lesser offset voltages with presently available switching transistors.

While the invention has been illustrated in connection with operational amplifier circuits, it is important to note that it is applicable as well to a variety of other electronic switching applications. While the transistors of switching unit 13 are shown as comprising NPN types, which are turned on by application of a positive voltage to their bases, it will be readily apparent that the invention is applicable as well to switch units using PNP types, and that by merely interchanging the connections of leads X and Y to the switch unit equivalent operation may be obtained.

While application of the radio frequency signal is shown as being effected by gating the oscillator on and off, it will be apparent at this point to those skilled in the art, and it is within the scope of the invention instead to utilize constantly running oscillators and to merely gate their outputs by means of conventional transistor gates. The specific embodiment shown is advantageous, however, in that it makes such gating transistors unnecessary, and because it allows the primary winding of transformer T–1 to function also as the oscillator tank circuit.

It will thus be seen that the objects set forth above, among those made apparent from the preceding description, are efficiently attained, and since certain changes may be made in the above construction without departing from the scope of the invention, it is intended that all matter contained or shown in the accompanying drawing shall be interpreted as illustrative and not in a limiting sense.

Having described my invention, what I claim as new and desire to secure by Letters Patent is:

1. An electronic switching circuit for controllably applying a variable input signal current having either polarity with respect to a reference level to a direct-coupled feedback amplifier, comprising, in combination: a direct-coupled feedback amplifier having a summing junction terminal, a reference terminal, inverting amplifying means connected to said terminals and operative to provide an output voltage at an output terminal, and feedback impedance means connected between said output terminal and said summing junction terminal; a semi-conductor switching device having first and second terminals, said first terminal being connected directly to said summing junction terminal of said amplifier and said second terminal being connected to receive said input signal current; and switch control means responsive to a switch control signal for switching said semi-conductor switching device between conducting and non-conducting conditions, said switch control means including a radio frequency transformer means having a primary inductor and an inductively-related secondary inductor, further means responsive to said switch control signal for switchably applying a radio frequency alternating signal to said primary inductor, and rectifying means, said secondary inductor and said rectifying means being connected in a series with each other and operative to apply rectified unfiltered pulses to said switching device, the frequency of said alternating signal being sufficiently high that successive ones of said rectified pulses occur in less time than the recovery time of said semi-conductor switching device.

2. Apparatus according to claim 1 in which said further means comprises radio frequency oscillator means for generating said radio frequency alternating signal and a second semi-conductor switching means responsive to said switch control signal for controlling the application of said alternating signal to said primary inductor.

3. Apparatus according to claim 2 in which said second semi-conductor switching means is operable to switch oscillator means between oscillating and non-oscillating conditions.

4. An electronic switching circuit for controllably applying an input signal voltage having either polarity with respect to a reference level to a direct-coupled feedback amplifier, comprising, in combination: a direct-coupled feedback amplifier having an input terminal, a reference level terminal, a summing junction terminal and an output terminal, input impedance means having first and second terminals, inverting amplifying means connected to receive the voltage between said summing junction terminal and said reference level terminal and operative to provide an output voltage at said output terminal, and feedback impedance means connected between said output terminal and said summing junction terminal, said second terminal being connected to said summing junction terminal; a semi-conductor switching device having third and fourth terminals, said third terminal being connected to said input terminal and said fourth terminal being connected to said first terminal of said input impedance means; and switch control means responsive to a switch control signal for switching said semi-conductor switching device between conducting and non-conducting conditions, said switch control means including a radio frequency transformer means having a primary inductor and an inductively-related secondary inductor, further means responsive to said switch control signal for switchably applying a radio frequency alternating signal to said primary inductor, and rectifying means, said secondary inductor and said rectifying means being connected in series with each other and operative to apply rectified unfiltered pulses to said switching device, the frequency of said alternating signal being sufficiently high that successive ones of said rectified pulses occur in less time than the recovery time of said semi-conductor switching device.

5. Apparatus according to claim 4 in which said further means comprises radio frequency oscillator means for generating said radio frequency alternating signal and a second semi-conductor switching means responsive to said switch control signal for controlling the application of said alternating signal to said primary inductor.

6. Apparatus according to claim 5 in which said second semi-conductor switching means is operable to switch oscillator means between oscillating and non-oscillating conditions.

7. An electronic switching circuit for controlling a direct-coupled amplifier, comprising, in combination: a direct-coupled amplifier having a summing junction terminal, a reference terminal, amplifying means connected to said terminals and operative to provide an output voltage at an output terminal, and feedback impedance means and a semi-conductor switching device connected in series between said summing junction terminal and said output terminal; and switch control means responsive to a switch control signal for switching said semi-conductor switching device between conducting and non-conducting conditions, said switch control means including a radio frequency transformer means having a primary indicator and an inductively-related secondary inductor, further means responsive to said switch control signal for switchably applying a radio frequency alternating signal to said primary inductor, and rectifying means, said secondary inductor and said rectifying means beng connected in series with each other and operative to apply rectified unfiltered pulses to said switching device, the frequency of said alternating signal being sufficiently high that successive ones of said rectified pulses occur in less time than the recovery time of said semi-conductor switching device.

8. An electronic switching circuit according to claim 1 including a transistor having a base terminal and collector and emitter electrodes, means connecting said electrodes between said second terminal and said reference terminal, and means for applying a signal to said base terminal to connect said second terminal to said reference terminal when said semi-conductor switching device is in its non-conducting condition.

9. Electronic switching apparatus for controllably connecting together a first terminal and a second terminal of a circuit in which the potentials of one or both of said terminals may vary in magnitude and sense with respect to the potential of a reference level terminal, without otherwise affecting the potentials of said first and second terminals relative to the potential of said reference level terminal, comprising, in combination: radio-frequency transformer means having a primary inductor and an inductively-related secondary inductor; control means responsive to an input control signal having first and second levels for controlling the application of a first radio-frequency alternating signal to said primary inductor, to apply said alternating signal to said primary inductor during said first level of said input control signal, thereby to induce a second radio-frequency alternating signal in said secondary inductor; rectifying means connected in series with said secondary inductor to provide rectified pulses; a semi-conductor switching device connected between said first and second terminals; and non-reactive circuit means for applying said rectified pulses to said switching device, the frequency of said alternating signals being sufficiently high that successve ones of said rectified pulses occur in less time than the recovery time of said semi-conductor switching device, said secondary winding, said semi-conductor switching device and said circuit means all being unconnected in a direct current sense to said reference level terminal other than through said first and second terminals, whereby the potential level of said secondary winding, said semi-conductor switching device and said circuit means may float with respect to said potential level of said reference level terminal.

10. Apparatus according to claim 9 in which said semi-conductor switching device includes first and second transistors of like conductivity type, each of said transistors having a base terminal and collector and emitter electrodes, said base terminal being interconnected at a third terminal and said collector electrodes being interconnected at a fourth terminal, said circuit means being connected to apply said rectified pulses between said third and fourth terminals, one of said collector electrodes being connected to said first terminal and the other of said collector electrodes being connected to said second terminal.

11. Apparatus according to claim 10 in which the recovery time of each of said transistors is *t* microseconds or greater and in which the frequency of said alternating signals is at least twice the reciprocal of *t* microseconds.

12. Apparatus according to claim 9 in which said semi-conductor switching device comprises first and second transistors of like conductivity type each having a collector, an emitter and a base terminal, said base terminals being interconnected and said collector terminals being interconnected and said second signal being connected between said base and collector terminals, said emitter terminals being connected to said first and second terminals, respectively.

13. Apparatus according to claim 9 in which said secondary inductor is center-tapped and in which said rectifying means comprises a pair of diodes connected to provide full-wave rectification of the voltage induced in said secondary inductor.

14. Apparatus according to claim 9 in which said control means comprises radio frequency oscillator means connected to apply said radio frequency alternating signal to said primary inductor of said transformer; and a second switching means connected to control the application of said radio frequency alternating signal to said primary inductor of said transformer, said second switching means being connected to be controlled by said input control signal.

15. Apparatus according to claim 9 in which the frequency of said radio frequency signal is equal to or greater than twice the reciprocal of the rated recovery time of said transistors.

16. Apparatus according to claim 9 having resistance means connected in parallel with said secondary inductor.

References Cited

UNITED STATES PATENTS

| | | | |
|---|---|---|---|
| 2,498,900 | 2/1950 | Schoenfeld | 328—127 |
| 2,952,785 | 9/1960 | Hodder | 307—88.5 |
| 3,005,113 | 10/1961 | Schmid et al. | 307—88.5 |
| 3,054,072 | 9/1962 | Beaulieu et al. | 331—172 |
| 3,144,563 | 8/1964 | Cohler | 307—88.5 |
| 3,248,560 | 4/1966 | Leonard | 328—150 |

ARTHUR GAUSS, *Primary Examiner.*

B. P. DAVIS, *Assistant Examiner.*